(12) United States Patent
Porter

(10) Patent No.: US 8,336,779 B1
(45) Date of Patent: Dec. 25, 2012

(54) SYSTEM FOR AUTOMATICALLY READING A RESPONSE FORM USING A DIGITAL CAMERA

(76) Inventor: Robert Austin Porter, Livermore, CA (US)

( * ) Notice: Subject to any disclaimer, the term of this patent is extended or adjusted under 35 U.S.C. 154(b) by 739 days.

(21) Appl. No.: 12/231,958

(22) Filed: Sep. 8, 2008

Related U.S. Application Data

(60) Provisional application No. 60/993,207, filed on Sep. 10, 2007.

(51) Int. Cl.
*G06K 7/10* (2006.01)
(52) U.S. Cl. ............... 235/462.41; 235/462.1
(58) Field of Classification Search ............ 235/462.1, 235/462.11, 462.24, 462.41
See application file for complete search history.

(56) References Cited

U.S. PATENT DOCUMENTS

| | | | |
|---|---|---|---|
| 7,573,616 B2* | 8/2009 | Poor | 358/474 |
| 2005/0247783 A1* | 11/2005 | Poulos et al. | 235/386 |
| 2009/0020606 A1* | 1/2009 | Chung et al. | 235/386 |
| 2010/0067031 A1* | 3/2010 | Greene | 358/1.13 |

* cited by examiner

*Primary Examiner* — Karl D Frech
(74) *Attorney, Agent, or Firm* — James M. Ritchey; John P. O'Banion

(57) ABSTRACT

A system for automatically reading a response form marked by a user, including the response form containing a structured set of markers and a structured set of response areas, a camera for obtaining a digital image which contains the response form, programming for identifying positions of a majority of the markers within the digital image, programming for using a set of structuring rules in conjunction with the positions of the markers to obtain a structured set of response areas, programming for reading responses located at the response areas, and programming for generating an output of user responses.

20 Claims, 14 Drawing Sheets

SYSTEM FOR AUTOMATICALLY READING A RESPONSE FORM USING A DIGITAL CAMERA

CROSS-REFERENCE TO RELATED APPLICATIONS

This application claims priority from U.S. provisional application Ser. No. 60/993,207 filed on Sep. 10, 2007.

BACKGROUND OF THE INVENTION

1. Field of the Invention

This invention pertains generally to an automatic reading of response forms in order to collect data. More particularly to the automatic reading of response forms for data collection in which a large form is capable of being scanned and the layout of the form is dynamically determined.

2. Description of Related Art

The present invention relates to the automatic reading of response forms in order to collect data. The most prominent example of this field is the use of optical mark reader (OMR) forms and scanners for testing in schools. These OMR forms are given to students for them to record their responses to multiple-choice test questions and then fed through an OMR scanner to score and interpret those responses. OMR technology is not only valuable for multiple-choice tests, however. Its use extends into other areas where data needs to be collected and processed.

While OMR technology is very valuable, it has many limitations. The first prominent limitation is that OMR scanners require specially produced forms. The fact that these forms cannot be printed or reproduced on plain paper makes them very expensive for schools that use them frequently. Another limitation is that OMR scanners are almost always sheet fed. Because moving parts are required to feed the forms through these machines, they are typically large, expensive, and require frequent maintenance and cleaning.

The expense of specially manufactured OMR forms is certainly limiting, and in recent years several inventions have addressed this issue by replacing traditional OMR scanners with scanners that digitally image the forms (see U.S. Pat. No. 6,970,267). The digital image is then processed in such a manner that the markings on the form can be ascertained and interpreted. While this addresses the limitation of not being able to print forms on plain paper, it does not address many of the other issues that trouble OMR scanners as these newer scanners are also typically sheet fed.

In order to address all of the above limitations, the present inventor created one set of solutions in which response forms may be printed on plain paper and in which no moving parts are used, excluding the person operating the system. However, the solutions previously offered by the subject inventor came with factors that limit the utility of the invention. The first of these is the requirement that the form size be relatively small in order for it to read. This is due to physical distortion that results with larger forms in addition to optical distortion caused by the lens of the camera when imaging larger areas. This limitation results in a maximum capacity of a response form that corresponds to roughly twenty questions with four options each (e.g. 'A', 'B', 'C', or 'D'). A second limitation is that the layout of the form had to be preprogrammed which does not allow for any flexibility.

Thus, the present invention was created to address all of the above limitations. The subject invention addresses the limitations of having moving parts and specially produced forms. Also, the present invention addresses the remaining limitations by allowing for larger forms to be scanned and for the layout of the forms to be dynamically determined.

BRIEF SUMMARY OF THE INVENTION

An object of the present invention is to provide an automatic system for reading a response form.

Another object of the present invention is to furnish an automatic form reading and reporting system having a digital camera, computer, and system programming.

A further object of the present invention is to supply an automatic system in which a user places a response form beneath a digital camera that transfers an image to a computer programmed to analyze and record the data.

Still another object of the present invention is to disclose an automatic grading and recording system that allows a user to digitize data on a response form by means of a digital camera and then automatically computer analyze and record that data at a desired location.

Disclosed is a data collection and reporting system that comprises three main components: a) a digital camera; b) a computer attached to the digital camera; and c) computer software running on the computer that directs the operation of the system. More specifically, a system for automatically reading a response form marked by a user is disclosed that comprises the response form containing a structured plurality of markers and a structured plurality of response areas, means for obtaining a digital image which contains the response form, means for identifying positions of a majority of the markers within the digital image, means for using a set of structuring rules in conjunction with the positions of the markers to obtain a structured set of response areas, means for reading responses located at the response areas, and means for generating an output of user responses.

Further objects and aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings, which are for illustrative purposes only.

DETAILED DESCRIPTION OF THE INVENTION

Figure 1:
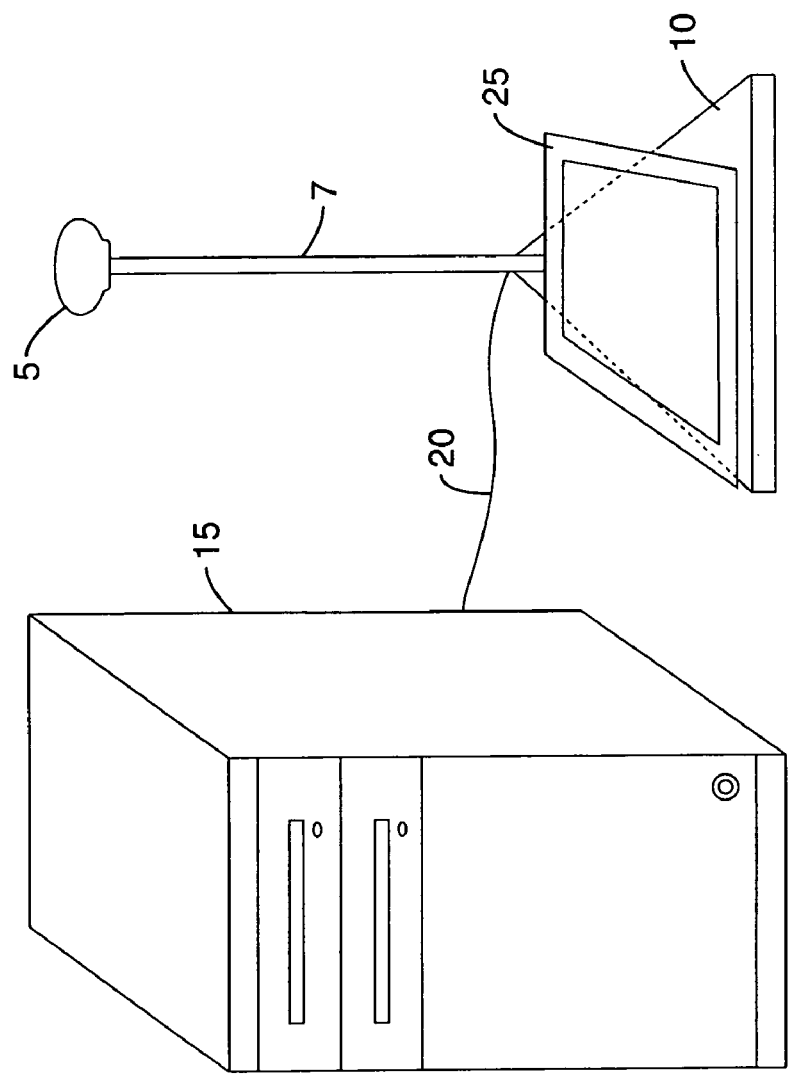
FIG. 1 is a perspective view of the system architecture according to the present invention.

Referring more specifically to the drawings, for illustrative purposes the present invention is embodied in the apparatus generally shown in FIG. 1 through FIGS. 10A and 10B. It will be appreciated that the apparatus may vary as to configuration and as to details of the parts, and that the method may vary as to the specific steps and sequence, without departing from the basic concepts as disclosed herein.

Again, a preferred embodiment of the invention is a device that comprises three main components: a) a digital camera; b) a computer attached to the digital camera; and c) computer software running on the computer. The subject invention is most easily understood by first understanding how a user interacts with it. Typically a user will use the invention to scan a set of response forms for processing or storage on the computer. In order to accomplish this task the user will typically begin by starting the software on the computer after verifying that the digital camera is attached. An illustration of the system is shown as FIG. 1, including: a digital camera 5, attachment pole 7; stand base 10; computer 15; computer-to-camera connector 20 (which could be wireless too); and a response form 25. The user will then take the first response form in a set and place it under the camera. Once the response form is in the view of the digital camera the software takes the digital image of the response form and attempts to interpret what the respondent intended to record on the response form. If the software is successful in this task it either stores the responses for further processing or passes the responses along to other computer software. For example if the responses correspond to the answers of a test, the software might determine a numerical score corresponding to the number of questions that were answered correctly. Typically a sound is played on the computer's speakers so that the user knows that the scan was successful and that they may proceed by placing the next form in the view of the camera.

The process of interpreting the digital image of the response form comprises the majority of the invention. In comparison with more traditional techniques of scanning response forms such as those employed by sheet fed scanners, those required to read a response form that is hand placed under a camera are much more complex. Sheet-fed scanners are guaranteed an image with very low distortion, and that the orientation and position of each form within the image stays nearly constant. The method used to scan in the present invention allows the form to be imaged from a distance, often while being held by the user's hand. As a result of this method, the response form is often physically distorted by being held by a hand, optically distorted from imperfections in the camera lens, and perspectively distorted as a result of being imaged at an unknown orientation. It is therefore a unique requirement of the present invention to have computer logic that is capable of locating the position and orientation of the form and compensating for the multitude of types of distortion.

Reading a response form that is hand placed under a camera presents still another challenge, and that is simply identifying the form's presence. In sheet-fed scanners there is a physical mechanism that tells the scanner when a form is in place and to proceed to read the contents. Since the present invention does not mechanically interact with the form in any way, there is no mechanical means for implementing such a feature. It is therefore necessary to have computer logic that recognizes the presence of a form.

The ultimate goal of the present invention is to allow humans to hand record data on a response form and later quickly and accurately read the data into a computer. The form plays an integral role in this process. In order for the form to do its job, it must provide a place for humans to put the data, context for a computer to find the data, and context for both humans and the computer to know which data corresponds to what (e.g., which location corresponds to question 3). The term "response area" is used in this application for the place where a human records a piece of information (i.e., a place for the person to make a mark or a place to write a character). Good context for a human is in general not good context for the computer. For example, a small 'A' character in a faint circle may indicate to a human that darkening the circle would denote an answer of 'A'. When imaged by a camera, though, this 'A' character in a faint circle may be completely blurred away by the camera's optics. In order for the form to be readable by not only a human but also the computer, context must be provided for the computer.

In order to provide context for the computer, a plurality of markers and structuring rules are employed. Markers are image features that are easily identifiable in the image by computer logic. The simplest, and therefore usually preferable, marker is a small solid black circle. Markers are used by the present invention to indicate the location of response areas. The computer logic must know how a sequence of marker locations translates into a sequence of response area locations, so a set of rules must be formulated for this purpose. In addition, these rules should also provide the context needed by the computer to know which response area corresponds to which datum. For the purpose of this application, the term "structuring rules" is used for this set of rules. The position of the markers in conjunction with the structuring rules defines the location of all response areas. The design of the forms that are readable by the present invention is not pre-specified, but rather if the design of the form satisfies the structuring rules currently in use, then the form will be readable.

It is often the case that for maximum robustness, markers alone are not enough to uniquely and reliably specify how the structuring rules should be applied. In these situations an additional image feature may be used to identify the general position and orientation of the form. An example of this is a dark border used to signify the edge of the form. The computer can use this border to identify the position and orientation of the form. This information may be used when applying the structuring rules to the marker locations. It should be noted that this additional image feature is not always needed (for example, if the present invention were applied to a situation where the form orientation was not variable).

Once the response areas have been identified and the correspondence between response areas and the data is established, the actual act of reading the data is trivial to one skilled in the art. Perhaps the simplest example of this is reading a bubble. The response area corresponds to the inside of the bubble. To determine the datum, the intensity of the image on the inside of the bubble is averaged. If the average intensity is dark enough, the bubble is identified as being marked. If, for example, the structuring rules told us that this response area corresponds to a certain answer on a certain question (e.g.

question 3, answer 'C'), the computer logic would know that the person indicated that answer for that question on the form.

Figure 2:
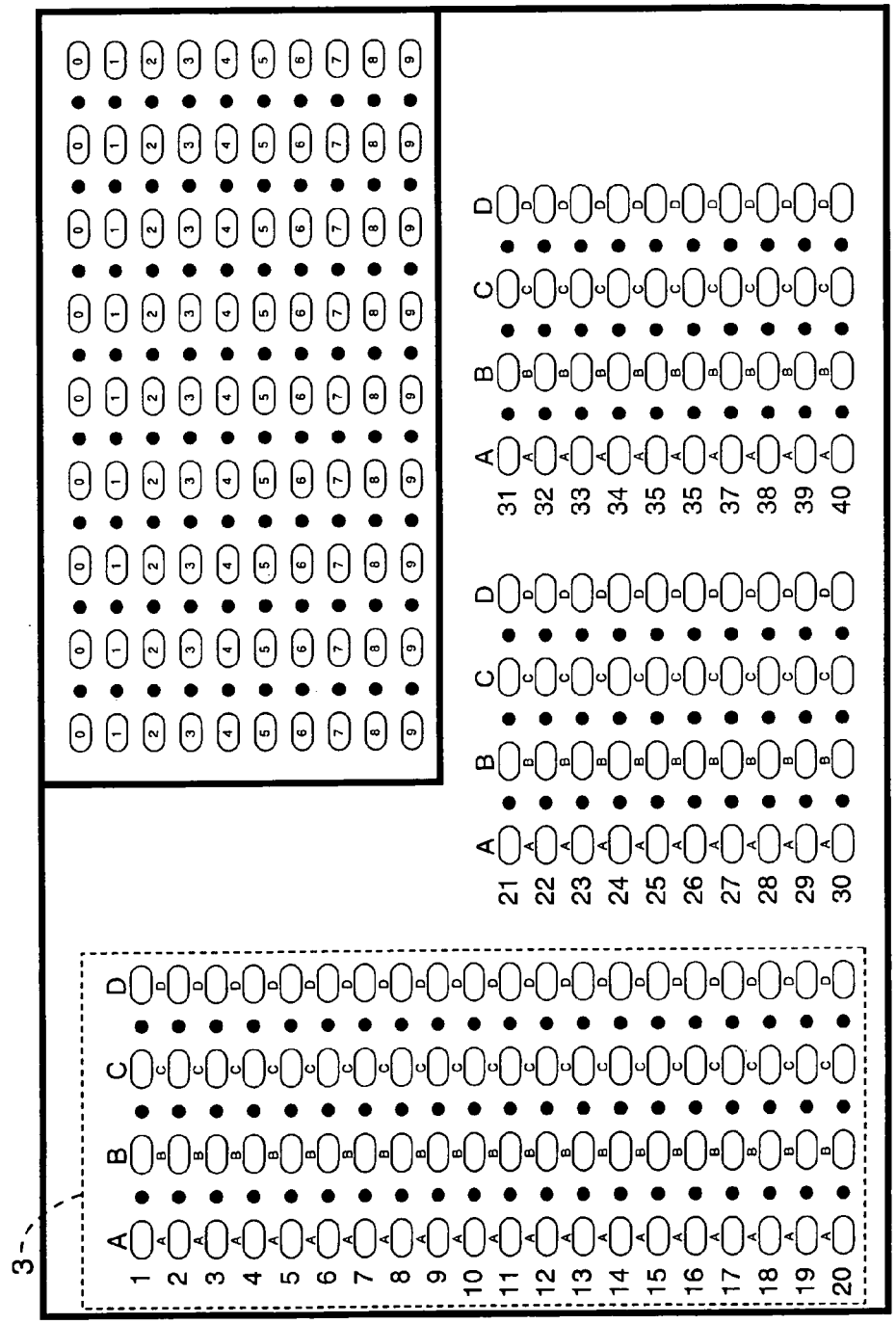
FIG. 2 is a plan view of an exemplary response form that would be readable given a valid set of structuring rules according to the preferred embodiment of the present invention.
Figure 3:
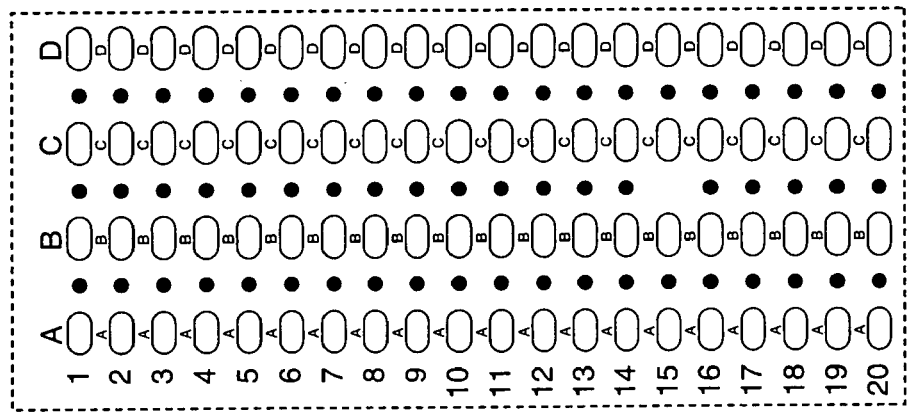
FIG. 3 is an exploded view of one block of the exemplary response form shown in FIG. 2 (see indicia 3 in FIG. 2).

Perhaps the most common embodiment of the present invention is a device used for reading multiple choice response forms. An example of a response form that could be used for such purpose is shown in FIG. 2. The exact form design, and structuring rules chosen, is highly dependent on the constraints of the particular implementation. The response form shown in FIG. 2 follows the following structuring rules, which are appropriate for a bubbled in multiple choice test:

1. The form is divided into individual subcomponents named blocks, with whitespace separating each block. An exploded view of an exemplary block is shown as FIG. 3.

2. Each block contains a two dimensional array of markers spaced evenly.

3. The spacing of markers within a block must be at least twice as small as the whitespace separating adjacent blocks.

4. For each row of markers, the area between two adjacent markers is a response area, as well as the area half a column to the left of the left most marker and half a column to the right of the right most marker.

5. The top right block is used to record an identification number.

Each digit is recorded in one column of response areas.

The value of the digit recorded in a column corresponds to which response area is the darkest.

The top bubble in a column corresponds with the '0' digit.

The value of each digit is incremented by one as you go down the rows.

6. All other blocks are used to record answers to questions.

Each row corresponds to one answer.

The question number of a response area is determined by ordering the rows from top to bottom, and the blocks from left to right.

The top row of the left-most block corresponds to question 1.

The question number of the top row of each additional block is equal to the last row of the block to the left incremented by one.

The question number is incremented by one as you go down the rows.

The value of the answer recorded in a row corresponds to which response area is the darkest.

The left most column corresponds with the answer 'A'.

Each additional column corresponds to the next letter in the alphabet after the column to the left.

Figure 5:
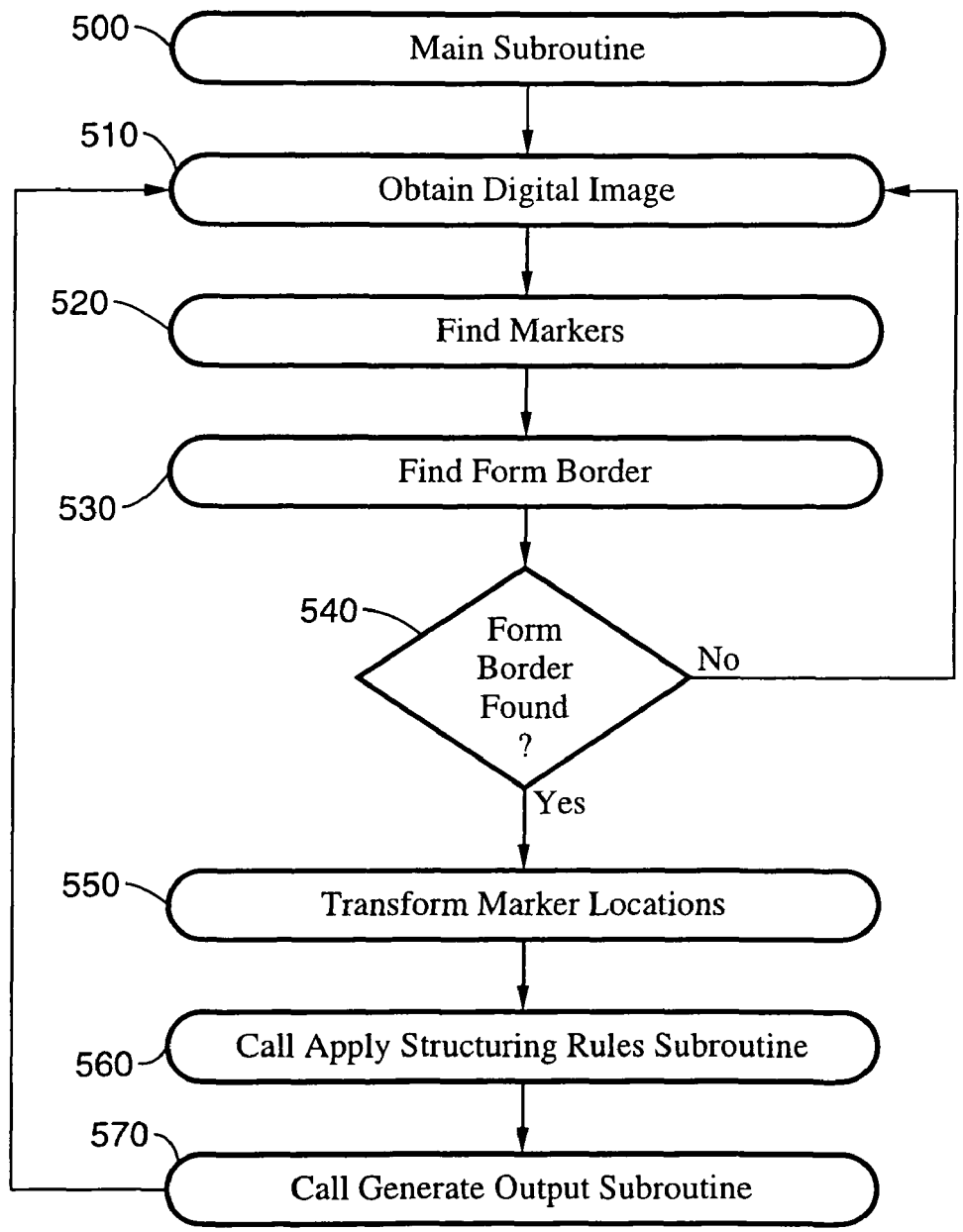
FIG. 5 is a flow chart of exemplary computer logic used to read a response form according to the preferred embodiment of the present invention.

The process of reading a response form is shown as a flow chart in FIG. 5. At step 500, the main subroutine begins. It should be noted that this subroutine does not exit. This is because the computer logic is always checking to see if a response form has been placed under the camera. In practice the main subroutine will exit when the computer program which contains the computer logic exits.

At step 510, a digital image is obtained from the digital camera. Typically the digital camera is attached to the computer using a universal serial bus (USB). Obtaining a digital image from a digital camera over USB is obvious to one skilled in the art. After completing this step, the computer logic has in memory an array of numbers representing pixel intensities that corresponds with the image which was obtained.

At step 520, markers are found in the image. The process of finding markers is dependent on the markers chosen for the form. If a black solid circle is used, the process may be as trivial as smoothing the image followed by applying a threshold and thinning algorithm well known in the art of computer image analysis. Other possible techniques include convolving the image with an exemplary marker image and then thresholding and thinning the result. In some applications it may be desirable to make the marker an unfilled circle. If this is the case, a circular Hough transform, also well known in the art, may be applied to find the markers. Each marker is represented by a marker object which contains the marker's image coordinates. Each marker object is stored in a list of markers.

At step 530, the form border is found in the image. This step is optional and is based on the design constraints of the implementation. If a dark border is added to signify the edge of the form, finding this border may be helpful in recognizing the presence of a form, and may be helpful in applying the structuring rules. Typically, such a border would be a rectangle and the process of finding the rectangle is a standard procedure (see for example U.S. patent application Ser. Nos. 10/236,024 and 10/609,114).

At step 540, the computer logic checks to see if a form border was found.

This step is useful in saving the logic from unnecessarily using the CPU time of the computer when no form is being scanned.

If the particular implementation has found the form border, the parameterization of the form border is used to transform the locations of the markers from a global image coordinate system to a local form coordinate system at step 550. Rotations, translations, and scaling of the form are taken into account by performing such a transformation. The result of this transformation is that the local (x, y) coordinates represent the position within the form, while the global (x, y) coordinates represent the position within the image. The transformation is made such that increasing the local x coordinate corresponds with traveling along the horizontal coordinate of the form, regardless of the orientation of the form. This step illustrates why it may be useful to find the form border. The transformation of coordinate systems may be used as a first defense against distortion of the form. Once the transformation is completed, the local (x, y) coordinates are added to the marker object for each marker.

Figure 6A:
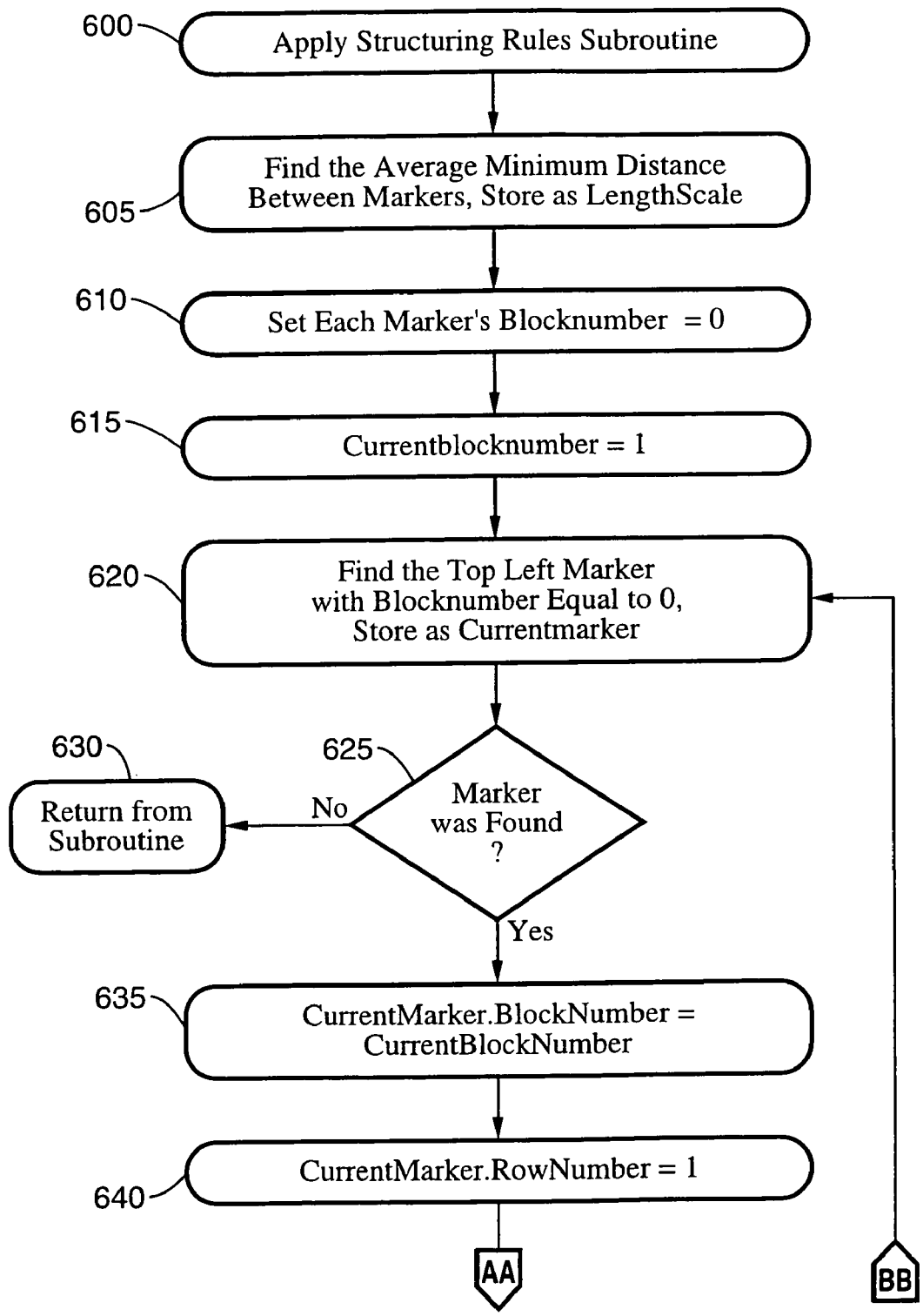
FIGS. 6A and 6B show a flow chart of exemplary computer logic used to implement the Apply Structuring Rules subroutine referenced in FIG. 5.
Figure 6B:
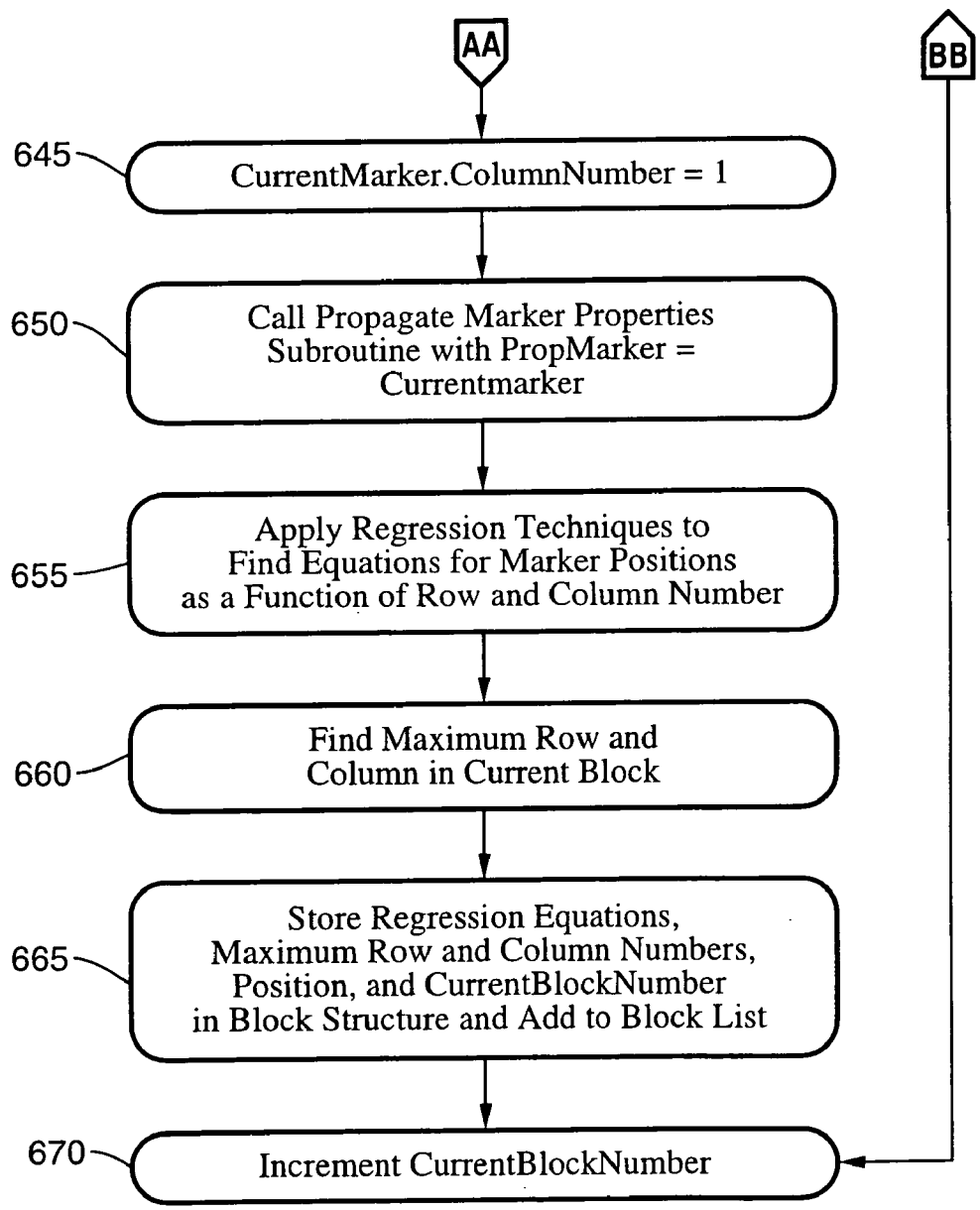

At step 560, the Apply Structuring Rules subroutine is called. One possible implementation of this subroutine is illustrated in FIGS. 6A and 6B. The goal of this subroutine is to take the list of marker objects and generate a set of equations that can be used to calculate the global coordinates of each response area. In addition, this subroutine calculates the number of rows and columns in each block, and the total number of blocks. The output of this subroutine contains all information necessary to calculate the image coordinates of each response area. The first part of the Apply Structuring Rules subroutine assigns an index to each marker based on the marker's position within the form. In the algorithm shown in FIGS. 6A and 6B the index assigned to each marker corresponds to a row, column, and block number. In the second part of this subroutine regression analysis is used to find a best fit equation for the image coordinates as a function of their index. These equations are later used to calculate the location of the response areas. It should be noted that the particular implementation of this subroutine may vary substantially depending on the structuring rules that are used, in particular the method in which an index is assigned to a marker and how the blocks are divided.

Figure 8:
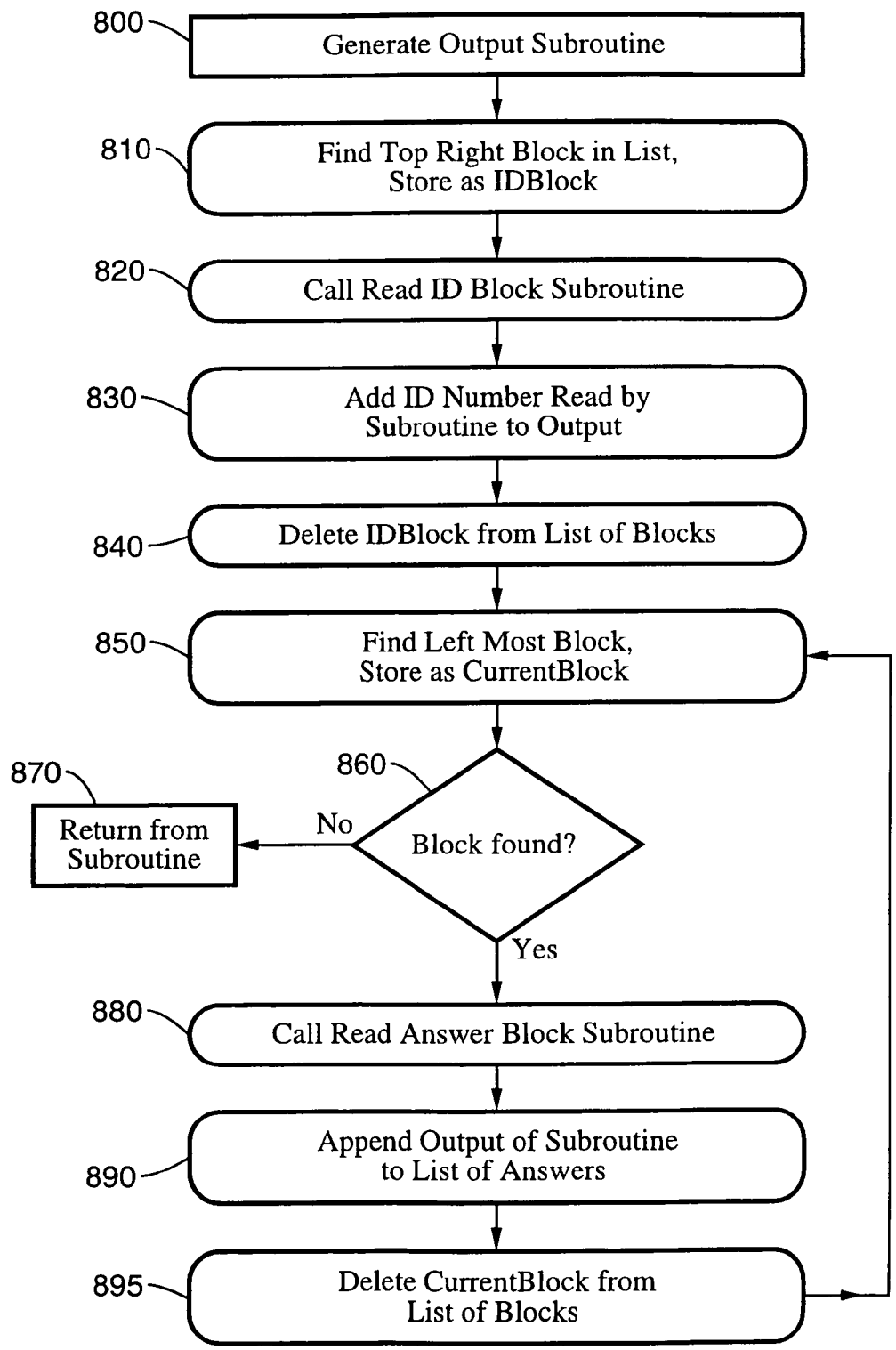
FIG. 8 is a flow chart of exemplary computer logic used to implement the Generate Output subroutine referenced in FIG. 5.

At step 570, the Generate Output subroutine is called. An exemplary implementation is illustrated in FIG. 8. The goal of this subroutine is to use the set of regression equations generated in the Apply Structuring Rules subroutine to calculate the global image coordinates of each response area, interpret the data recorded at these coordinates, and generate output based off of this data. The implementation may vary depending on the type of data recorded in the response area or the structuring rules in use. FIG. 8 shows an implementation which corresponds to generating output for a multiple choice response form which follows the same structuring rules as enumerated previously. Modification of this step to suit other types of data or other types of structuring rules should be obvious given the framework presented in this application. In general the procedure for this subroutine is to take the output of the Apply Structuring Rules subroutine, which is typically a list of block objects which store the number of rows and columns as well as the regression analysis equations, and use the information contained in the output to calculate the global image coordinates of each response area. Once the coordinates of each response area are calculated, the data of each response area is read and organized based off of the structuring rules. Reading the data for each response area is dependent on the type of data stored. The algorithm shown in FIG. 8 demonstrates how to implement this subroutine to read multiple choice response forms.

One possible implementation of the Apply Structuring Rules subroutine is shown as a flow chart in FIGS. 6A and 6B. This implementation of the Apply Structuring Rules subroutine assumes that structuring rule 1-3 of the structuring rules previously enumerated are being used.

At step 605 a length scale is calculated. Each marker's nearest neighbor is found. The average minimum distance between nearest neighbors is stored in the variable LengthScale. This number corresponds to an estimate of the distance between adjacent markers.

At step 610 each marker object's BlockNumber member variable is set to zero. This variable corresponds to which block the marker belongs to. Setting this variable to zero is the method used by this algorithm to keep track that this marker has not been assigned to a block yet.

At step 615 the variable CurrentBlockNumber is set to one. The CurrentBlockNumber variable is used to store the current block number which is being assigned by the algorithm. The algorithm assigns block numbers to markers sequentially (i.e. the block number of markers in block one are assigned, then the block number of block two, etc.).

At step 620 the marker object with the top left most local image coordinates and BlockNumber equal to zero is found. A reference to this marker object is stored as CurrentMarker.

At step 625 the subroutine checks to see if a marker object was found. If a marker object was not found then all of the markers have been processed, so the subroutine returns at step 630. If a marker was found, the subroutine continues to step 635.

At step 635 BlockNumber variable of the marker object referenced by CurrentMarker is set to CurrentBlockNumber. This assigns this marker to the CurrentBlockNumber block.

At step 640 and 645 the row and column number of the marker object referenced by CurrentMarker is set to one.

Figure 7A:
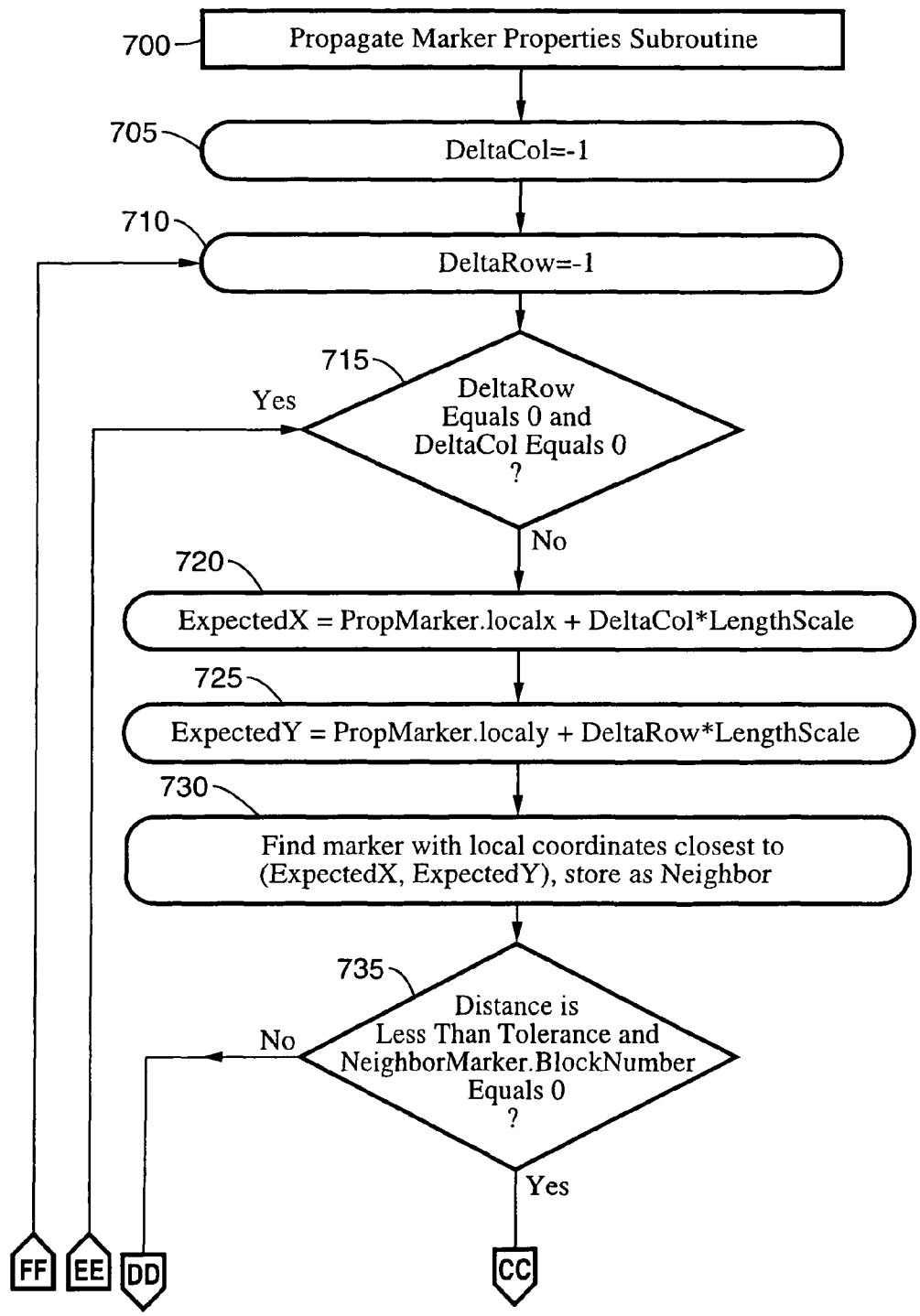
FIGS. 7A and 7B show a flow chart of exemplary computer logic used to implement the Propagate Marker Properties subroutine referenced in FIGS. 6A and 6B.
Figure 7B:
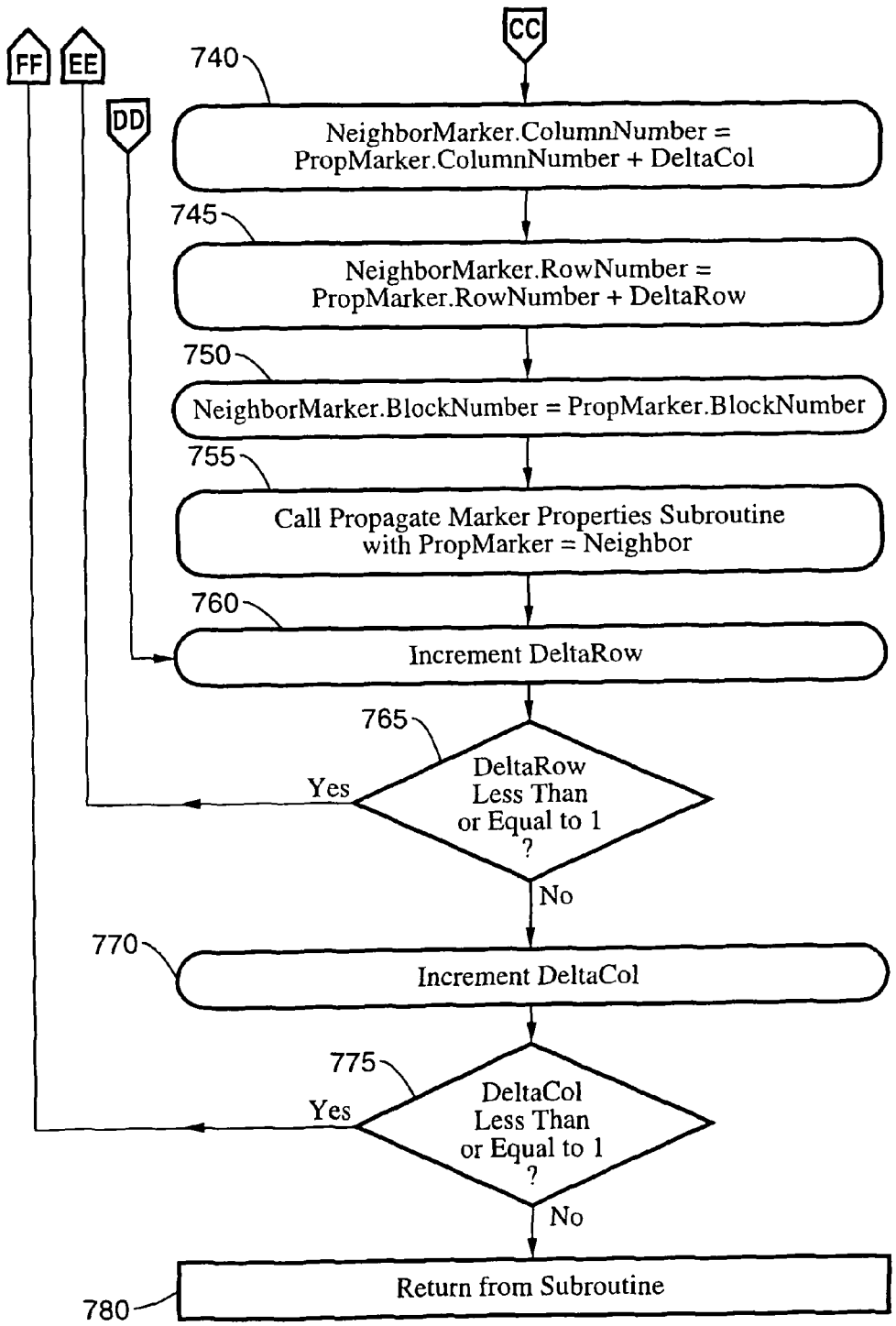

At step 650 the Propagate Marker Properties subroutine is called with the PropMarker argument set to reference the marker object referenced by CurrentMarker. A flow chart illustrating the Propagate Marker Properties subroutine is shown in FIGS. 7A and 7B.

At step 655 regression analysis is used to find a set of best fit equations for the global image coordinates of the markers contained in the block as a function of the row and column number of the marker within the block. The form of the equation used for regression analysis may be adjusted depending on the size of the form and the expected degree of distortion, but a good choice is $x=A+B*row+C*col+D*row*col$, and $y=E+F*row+G*col+H*row*col$. This equation form is completely general, and higher order terms may be added if more extreme forms of distortion are expected. It must be noted that the number of parameters must be small enough that the equations are not over fit, as is well known in the field of regression analysis. Typically the regression analysis works by minimizing a chi squared error estimate function. For the present application, the chi squared function is defined as the square of difference between the expected and measured value for each coordinate and for each marker. Markers which were not found are omitted from the regression analysis.

At step 660 the maximum row and maximum column of any marker within the current block is found. At step 665 these values are stored in an object used to represent the current block. The block object (or structure) also stores the position of the block, which may be defined as the average marker position of markers within the block. The regression analysis coefficients are also stored in the block object.

At step 670 the CurrentBlockNumber variable is incremented and the logic jumps back to step 620.

The Propagate Marker Properties subroutine referenced by FIGS. 6A and 6B are shown in FIGS. 7A and 7B. The logic for the subroutine begins at step 700. The goal of this algorithm is to take a marker and find all of its neighbors. If the neighbors are where they are expected if the markers are spaced evenly, the neighbor markers are assigned the same block number as the initial marker. In addition, the row and column number of this neighbor marker is set according to its position with respect to the initial marker and the row and column number of the initial marker. The subroutine recursively calls itself for each new marker that it finds. Eventually every marker within the block will have its properties assigned. PropMarker is the variable name used for the initial marker parameter.

At step 705 two variables are introduced: DeltaRow, and DeltaCol. These variables represent the difference between the initial markers row and column number and the row and column number of the marker we are searching for. The algorithm searches for neighbors within one row or column of the initial marker, so DeltaRow and DeltaCol are both set to negative one. The algorithm then loops over all values of DeltaRow and DeltaCol between negative one and one. At step 710 the algorithm verifies that the neighbor we are looking for is not the initial marker.

At step 715 the logic calculates where it expects the neighbor to be. The expected local coordinates of the neighbor marker are estimated based off the initial markers coordinates and the assumption that the markers are evenly spaced. In reality there will be distortion, so the expected coordinates will not be precisely where the marker is found.

At step 720 the algorithm searches through the list of markers for the marker with the smallest distance from the expected location. Because there is distortion the distance will not be exactly zero. At step 725 the distance is compared with a tunable tolerance parameter. If the distance is within the tolerance, the logic proceeds to propagate the marker properties to this neighbor. If the neighbor has already been assigned its properties, the logic will skip the neighbor. This is to prevent the algorithm from getting stuck in an infinite recursive loop.

At steps 730 the neighbor markers row and column numbers are set according to the initial markers row and column numbers and the DeltaRow and DeltaCol variables. The neighbor marker's block number is set to the initial marker's block number.

At step 735 the subroutine calls itself with a new initial marker parameter set equal to the current neighbor. In this way, the subroutine recursively propagates the marker properties to all markers connected within the block.

Steps 740 through 755 contain the remaining logic for looping through values of DeltaRow and DeltaCol between negative one and one, and at step 760 the subroutine returns.

FIG. 8 illustrates how to implement the Generate Output subroutine appropriate for reading a multiple choice response form that follows the structuring rules previously enumerated. The subroutine begins at step 800.

At step 810 the subroutine finds the ID block. According to the structuring rules used for this demonstration, the ID block is the top right block, so the logic must find the block which is closest to the top right. This block is stored as the variable IDBlock.

At step 820 the Read ID Block subroutine is called. The block object corresponding with IDBlock is passed as a parameter. The Read ID Block subroutine takes the ID block object as input and outputs the number which was filled in.

At step 830 the subroutine takes the ID number read by the Read ID Block subroutine and adds it to the output.

At step 840 the block corresponding with IDBlock is deleted from the list of blocks. This step is performed so that the same block is not read a second time as an answer block.

At step 850 the left most block is found. The left most block is stored as CurrentBlock. According to the structuring rules used for this demonstration, each answer block is read from left to right.

At step 860 the subroutine checks to see if any block was found. If no block was found the subroutine has completed the process of reading the form and returns at step 870. When the subroutine returns the ID number and list of answers read are outputted.

At step 880 the Read Answer Block subroutine is called. The block object corresponding with CurrentBlock is passed as a parameter. The Read Answer Block subroutine takes the current block object as input and outputs the list of the answers filled in.

At step 890 the list of answers generated by the Read Answer Block subroutine is added to the list of answers for the form. Since the structuring rules specify that the form is to be read from left to right, the list of answers read for this block is appended to the end of the list of answers for this form.

At step 895 the block objects corresponding to CurrentBlock is deleted from the list of blocks. This step is to prevent the block from being read multiple times.

Figure 9A:
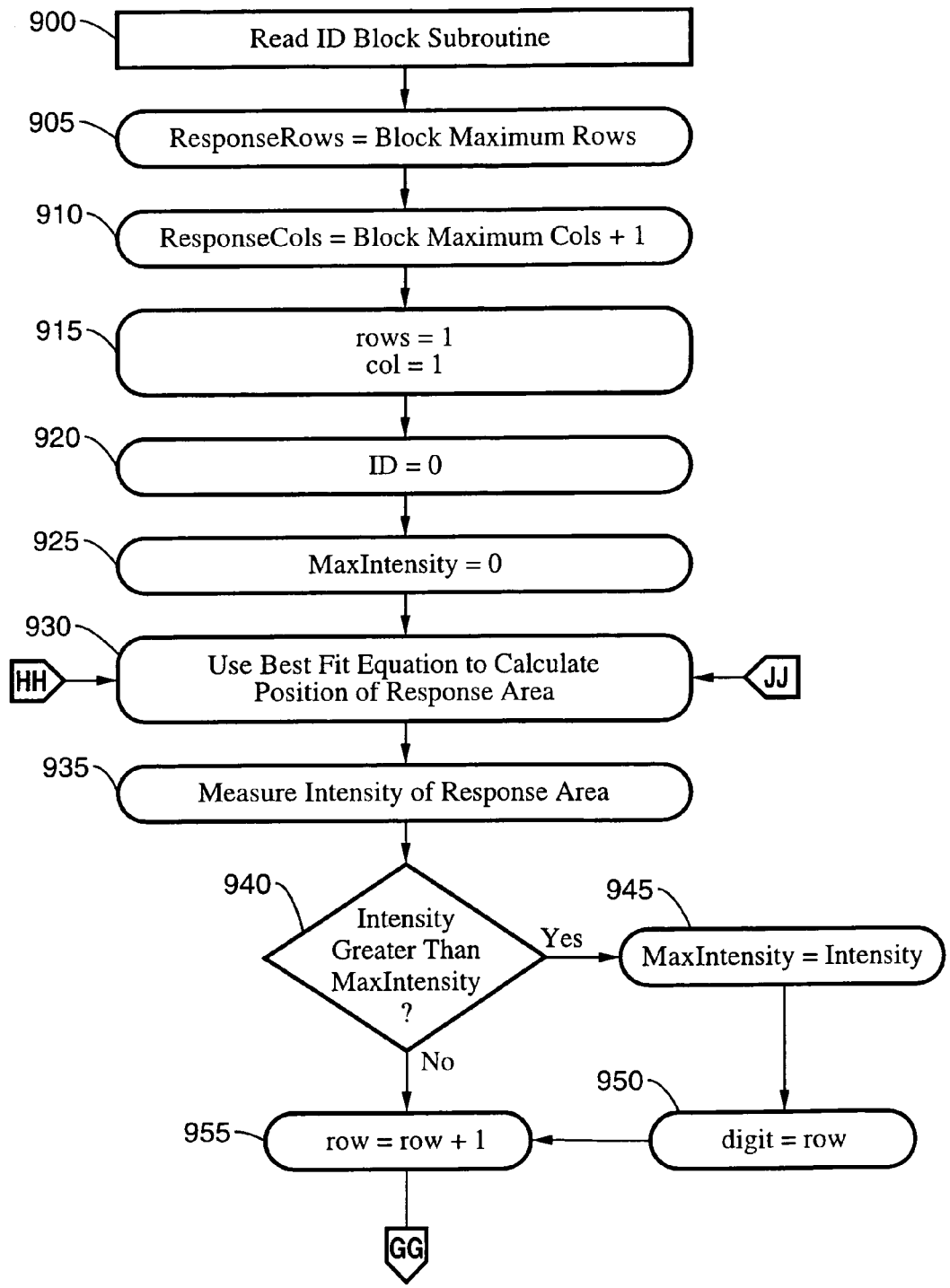
FIGS. 9A and 9B show a flow chart of exemplary computer logic used to implement the Read ID Block subroutine referenced in FIG. 8.
Figure 9B:
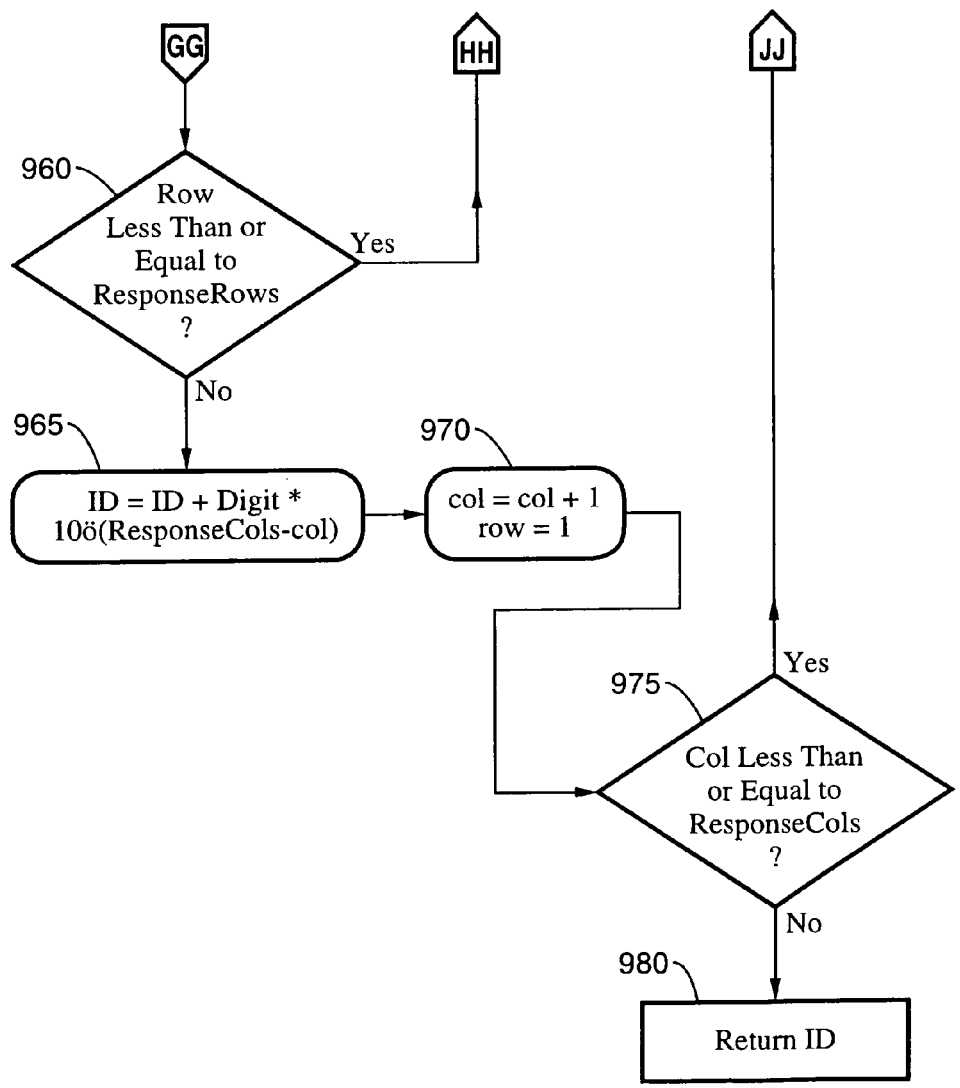

FIGS. 9A and 9B show an implementation of the Read ID Block subroutine. This subroutine takes as an argument the block object to be read. The subroutine begins at step 900.

At steps 905 and 910 the dimension of the array of response areas is determined. Given the structuring rules implemented, the array of response areas has the same number of rows as the array of markers, but the number of response area columns is equal to the number of markers plus one.

At step 915 two variables are introduced and initialized. The variable row represents the current row, and the variable column represents the current column. These variables are used as indices to loop over all response areas in the block. Both variables are initialized to one.

At step 920 the ID variable is introduced. This variable represents the ID number currently being read. The value is initialized to zero. As the subroutine proceeds, it adds one digit to the number at a time. The value of this variable is returned by the subroutine.

At step 925 the MaxIntensity variable is initialized to zero. This variable represents the maximum level of darkness of any given digit.

At step 930 the subroutine uses the best fit equations previously calculated for the coordinates of the markers within the block to calculate the global image coordinates of the current response area. The structuring rules current in use dictate that the response area is half a column offset from the markers. In order to calculate the global image coordinates of the current response area, the logic need only insert the response areas row and column number, with 0.5 subtracted from the column number, back into the regression analysis equations. The resulting coordinates should be an excellent approximation of the response areas position.

At step 935 the average intensity of the response area is measured. Typically this is done by averaging over the pixel values in the near region of the image coordinates calculated. Note that in this context intensity refers to the intensity of the marking, so a large value of intensity corresponds with a darker marking and smaller light intensity.

At step 940 the subroutine checks to see if this new intensity is greater than the previous maximum. If the intensity is greater, the value is stored as the new MaxIntensity, and the digit read is tentatively set to the current row.

At steps 955 the row number is incremented. At step 960 if the row number is less than or equal to the number of response rows, the logic jumps back to step 930.

Once all rows in the current columns have been looped over, the row which had the darkest response area is stored as digit. The contribution to the ID depends on which column was read. The contribution is given by the digit multiplied by ten to the power of the number of columns from the right most column. This contribution is added to the ID number at step 965.

At step 970 the row, column (col), and MaxIntensity variables are adjusted so that the next column may be read. Step 975 checks to see if the last column was read. If the last column was read the subroutine returns the ID number which was read at step 980.

Figure 10A:
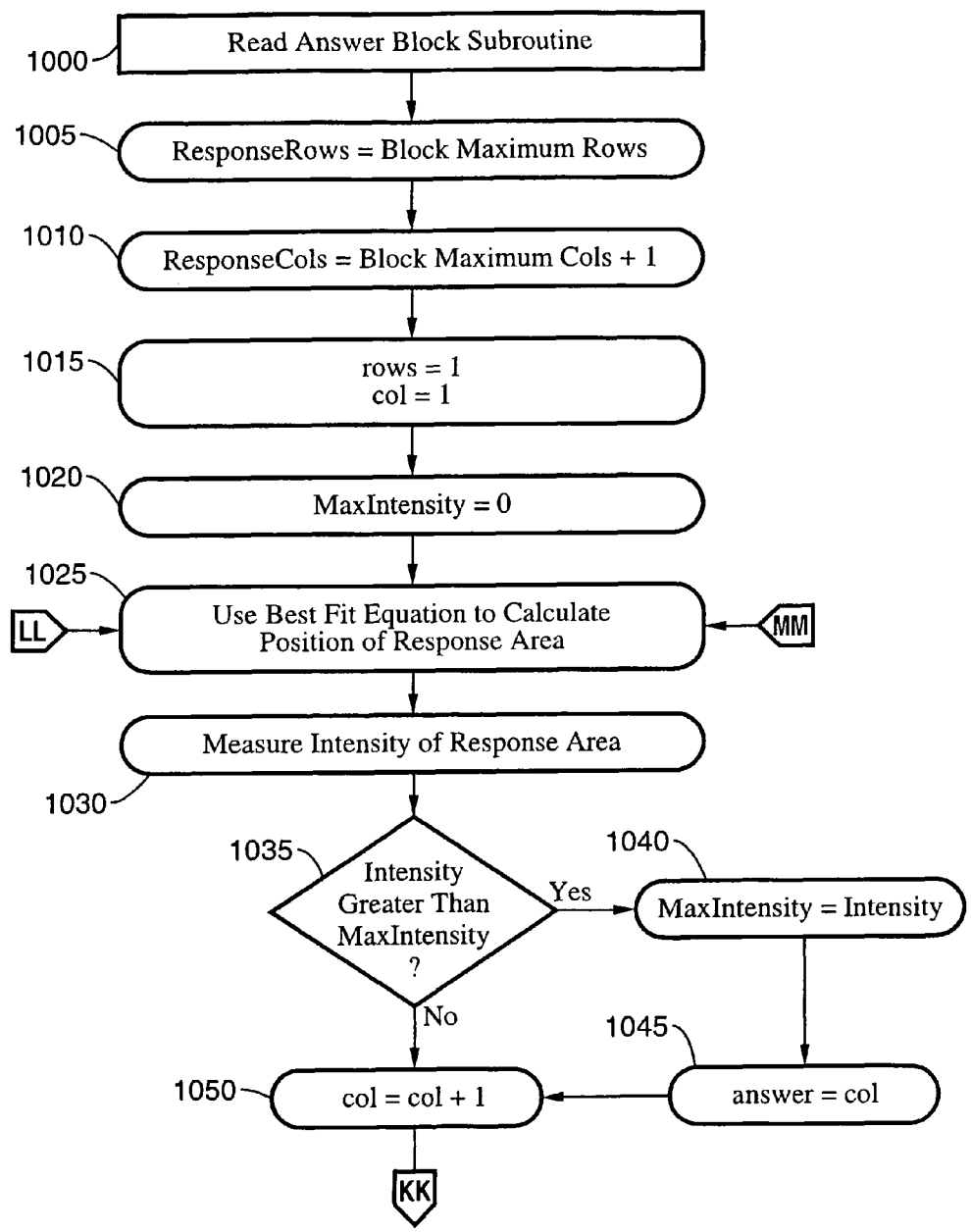
FIGS. 10A and 10B show a flow chart of exemplary computer logic used to implement the Read Answer Block subroutine referenced in FIGS. 9A and 9B.
Figure 10B:
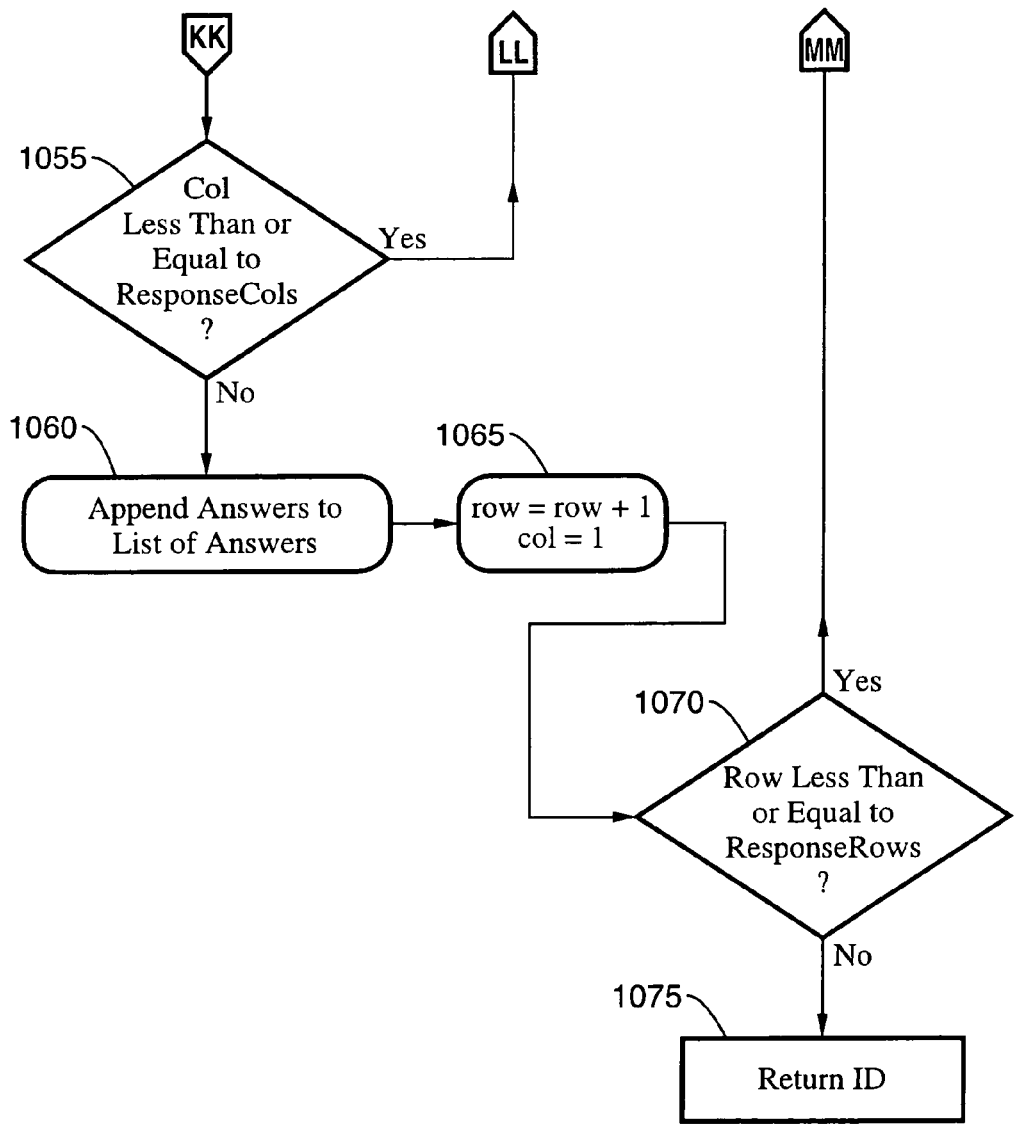

FIGS. 10A and 10B represent the Read Answer Block subroutine. This subroutine is very similar to the Read ID Block subroutine, with a few exceptions. The first exception is that answers are stored in the rows, whereas in the Read ID Block the digits were stored in columns. Because of this change, the order of looping is swapped between rows and columns. The second change is that the Read ID Block subroutine calculated an ID number. This subroutine simply stores the answer from each row in a list. The list of answers which were read is returned from the subroutine.

It should be understood that the logic shown in the present application is only for illustrating how one may implement the present invention. The computer logic may vary substantially. In particular, it should be noted that many additional validations may be added to the algorithm which have been omitted for clarity. For example, after applying the fitting procedure, a chi-square goodness of fit test can be performed. If the chi-square value is too large, the scan may be rejected. All of these additional validations should be obvious to one skilled in the art. Furthermore the implementation described above assumes the structuring rules as previously enumerated. There are many variations on the structuring rules outlined that allow for a wide variety of forms to be scanned. The variations may require subtle changes to the computer logic implemented, but the computer logic will maintain the overall structure as outlined above. Particularly the main subroutine illustrated in FIG. 5 should not vary substantially when different structuring rules are implemented.

Figure 4:
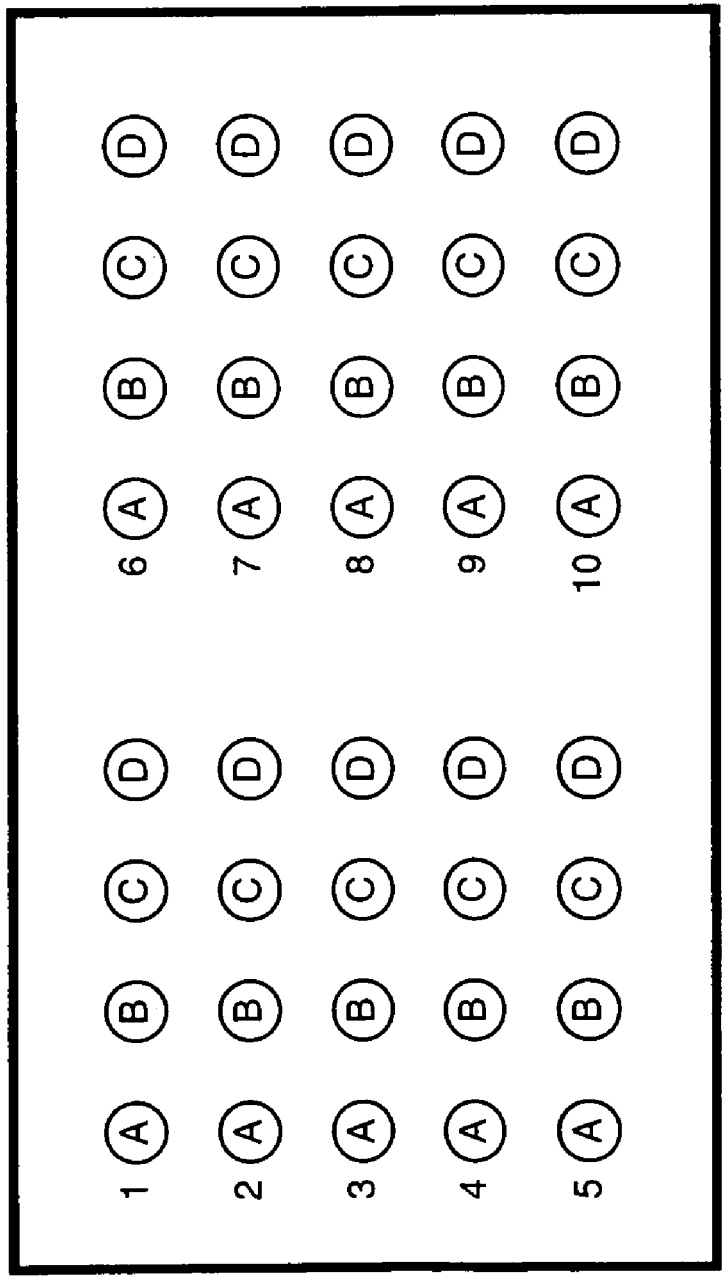
FIG. 4 is a plan view of an exemplary response form which follows a different set of structuring rules according to yet another possible embodiment of the present invention.

An example of a response form that follows a different set of structuring rules is shown in FIG. 4. This example further illustrates the power of the disclosed invention. With subtle changes to the logic, a large variety of response forms are readable. This example form has a very different structure than the form shown in FIG. 2. In particular it should be noted that dark filled circles used as markers in the response form of FIG. 2 are absent from this response form. This response form uses the circles that define a bubble as both a marker and a response area. In order for this form to be readable by the logic only a few subtle changes must be made. First, the logic must search for empty circles instead of filled circles, for example by using a circular Hough transform. Second, the offset between markers and response areas must be set to zero and the number of response columns must be set to the number of marker columns.

This example illustrates the robustness of the invention. The logic must be able to identify that position of each response area in order for the invention to be able to read the form. Consider the case of the form shown in FIG. 4 marked by a user. In this case for each block one bubble per row is filled in. If the logic is designed to search for unfilled circles, it will not identify the filled circles as being markers. This is completely acceptable due to the way the logic is written. As long as enough markers are identified to successfully index the majority of the markers, the logic will be able to use regression analysis to predict the location of each response area.

It is presumed that the primary use of the present invention is to read multiple choice response forms, as previously described, it is also fully anticipated that other forms of data may be read with present invention. For instance the above described implementation could be used to identify the location of handwritten answers to a multiple choice test. The response area in this situation would be the area for the user to write an answer. The described logic is capable of finding these response areas, and the process of reading what is written in the response area, hand writing recognition, is a well known technology.

Yet another anticipated variation on the previously described implementation is that the data contained in the response area may be different for different response areas. For instance it would be possible to use one response area on a form to contain a barcode and all other response areas to contain bubbles for marking. This would allow information to be stored on the form at the time of printing and allow a person the bubble in additional information.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A system for automatically reading a response form marked by a user, comprising:
    a response form containing a structured plurality of markers and a structured plurality of response areas;
    means for obtaining a digital image which contains said response form;
    means for identifying positions of a majority of said markers within said digital image that has optical distortions from lens imperfections or perspective distortions from imaging at an unknown orientation or physical distortions in the form;
    means for using a set of structuring rules in conjunction with said positions of said markers to obtain a structured set of response areas;
    means for reading responses located at said response areas; and
    means for generating an output of user responses.

2. A system according to claim 1, wherein said response areas are suitable for marking and means for reading responses located at said response areas comprises logic to determine if marking is sufficiently dark to be considered marked.

3. A system according to claim 1, wherein said response areas are suitable for writing an alphanumeric character and means for reading responses located at said response areas comprises hand writing recognition logic.

4. A system according to claim 1, wherein said positions of said markers are coincident with positions of said response areas.

5. A system according to claim 1, wherein said means for obtaining a digital image comprises a camera selected from a group consisting of a CMOS camera and a CCD camera, and programming logic run on a computer.

6. A system according to claim 1, wherein said marker is a circle and said response area is inside said circle.

7. A system according to claim 1, wherein one or more of said response areas comprises a bar code.

8. A system for automatically reading a response form marked by a user, comprising:
    a response form containing a structured plurality of markers, a structured plurality of response areas, and one or more image features used for identifying a position and/or orientation of the user response form;
    means for obtaining a digital image which contains the user response form that have optical distortions from lens imperfections or perspective distortions from imaging at an unknown orientation or physical distortions in the form;
    means for identifying positions of a majority of said markers within said digital image with distortions;
    means for identifying at least one position-orientation identifier selected from a group consisting of a position to yield a position identifier and an orientation to yield an orientation identifier of said digital image,
    means of using said digital image position-orientation identifier to calculate a position from said position identifier and an orientation from said orientation identifier of the user response form;
    means for using a set of structuring rules in conjunction with said positions of said markers, said user response form position, and said user response form orientation to obtain a structured set of response areas;

means for reading responses located at said response areas; and means for generating an output of user responses.

9. A system according to claim 8, wherein said means for obtaining a digital image comprises a camera selected from a group consisting of a CMOS camera and a CCD camera, and programming logic run on a computer.

10. A system according to claim 8, wherein said image features comprises at least one dark rectangle which defines a border of the response form and is used for identifying a position and/or orientation of the response form in the digital image.

11. A method for identifying the image coordinates of a response area on a document, comprising:
  placing a plurality of markers on a document;
  identifying image coordinates for each said marker;
  assigning a generalized index to each said marker;
  using regression analysis to find best fit equations for said image coordinates of said markers as a function of said marker index; and
  using said best fit equations to calculate the image coordinates of a response area.

12. A system for automatically reading a response form marked by a user, comprising:
  a response form containing a plurality of markers and a plurality of response areas;
  a digital imager capable of producing at least one digital image of the response form; and
  a computer operably coupled to the digital imager, the computer having programming for carrying out steps comprising:
    identifying the presence of and locations of a plurality of markers in an acquired digital image;
    transforming marker locations to produce a local form coordinate system;
    applying structuring rules to designate a structured set of response areas;
    reading responses in designated response areas; and
    generating an output of user responses;
  wherein a user can image and process different response form configurations in succession.

13. A system as recited in claim 12, wherein said programming further carries out steps comprising:
  identifying the location of a border on said response form prior to marker transformation.

14. A system as recited in claim 12, wherein said application of structuring rules on identified global image coordinates for each marker, comprises:
  assigning a generalized index to each marker;
  using regression analysis to find best fit equations for the image coordinates of the markers as a function of the marker index; and
  using best fit equations to calculate the image coordinates of a response area.

15. A system as recited in claim 12, wherein identifying the presence of and locations of a plurality of markers in an acquired digital image comprises:
  identifying the global coordinates of an initial marker;
  estimating the coordinates of neighbor markers;
  determining the actual coordinates of neighbor markers;
  comparing the estimated coordinates with the actual coordinates of neighbor markers; and
  assigning marker properties to neighbor markers.

16. A system as recited in claim 12, wherein one or more of said response areas of said form comprises a bar code.

17. A system as recited in claim 12, wherein said reading responses in designated response areas comprises handwriting recognition.

18. A system as recited in claim 12, wherein said reading responses in designated response areas comprises determining if marking is sufficiently dark to be considered marked.

19. A system as recited in claim 12, wherein said generating an output of user responses comprises:
  reading an identification block;
  listing responses;
  comparing listed responses to a response key; and
  recording form data.

20. A system according to claim 12, wherein the response form design is not pre-specified but is determined by a set of structuring rules and measured marker positions.

* * * * *